3,848,029
TRIMETHYLOLALKANE DI-ALLYL ETHER-ESTER COATING COMPOSITIONS

Edward Davis Watkins, La Grange, Ky., assignor to Celanese Coatings & Specialties Company, New York, N.Y.
No Drawing. Filed Nov. 1, 1973, Ser. No. 412,372
Int. Cl. C08f 29/24
U.S. Cl. 260—899  7 Claims

ABSTRACT OF THE DISCLOSURE

A coating composition comprising about 8 to about 75% of a polyvinyl chloride-based resin and about 90 to about 25% of a polycarboxylic acid polyester of trimethylolalkane di-allyl ether useful in can and metal decorating applications is disclosed.

BACKGROUND OF THE INVENTION

This invention pertains to coating compositions and more particularly to non-polluting high solids compositions useful in can coating and other metal decorating areas.

The multiple problems of air pollution have forced the coatings industry to search for non-polluting coating systems. In the prior art the coating of cans and metal products has most often been done utilizing coating systems which have a large amount of an organic solvent present. The solvent which is driven off during baking or curing must be disposed of generally by incineration. The search has thus continued for new coating systems which are either water-based or, as in the case of this invention, are utilized at extremely high solids, i.e., 80 to 90% solids, with the remainder being solvent. In preparing conventional water-based coatings, the resin system is generally dissolved in a water miscible organic solvent in a ratio of, for example, 1 part solvent to 2 parts resin. This solution is then reduced with water to application viscosity, generally about 30%. In such water-based systems there are 50 parts of organic solvent to be driven off or evaporated for 100 parts of film forming resin. In high solids coatings, wherein the solids content is at least 80%, there are only, at the most, 25 parts of organic solvent to be driven off for 100 parts of film forming solids.

From a polluting standpoint, the advantages of high solids coatings are self-evident.

In addition, the search has continued in the coating industry for high flexibility coatings products which may be applied to metal prior to forming. This need is especially in evidence in the can coating industry where, following coating, can ends must be formed to meet with the can body.

The water-based systems currently available do not possess sufficient flexibility to allow forming, bending or shaping under normal conditions.

SUMMARY OF INVENTION

These and other prior art problems are overcome by the coating composition of the instant invention. Basically, the invention involves a polyvinyl chloride-based resin dispersed in a trimethylol alkane di-allyl ether polyester of a polycarboxylic acid. The level of the polyvinyl chloride may range from about 10 to about 75%, with the remainder being the polyester.

DESCRIPTION OF THE INVENTION

The polyvinyl chloride (PVC) resins which are useful in this invention are the homopolymers of vinyl chloride and the copolymers of vinyl chloride with one or more copolymerizable monomers, said polymers containing at least 60% by weight of polymerized vinyl chloride. Monomers which can be copolymerized with vinyl chloride to produce the resins useful in this invention include vinyl acetate, vinylidene chloride, fumaric and maleic acid esters of alcohols which contain one to ten carbon atoms, acrylic and methacrylic acid esters of alcohols which contain one to ten carbon atoms, acrylonitrile, alkyl vinyl ethers, wherein the alkyl group contains 2 to 6 carbon atoms, ethylene and propylene. Particularly useful resins are polymers of vinyl chloride and vinyl acetate in which part of the acetate groups are hydrolyzed to alcohol groups. Other useful resins are terpolymers of vinyl chloride with vinyl acetate and a small amount, 0.5 to 1.5 percent by weight, of fumaric or maleic acid.

Polyvinyl chloride resins used in this invention must be sufficiently friable to be pulverized to a finely divided state so that they can be readily dispersed in the polyester composition. Dispersible resins are those which will pass through a 100 mesh sieve (U.S. Standard Sieve), i.e., those having particle sizes less than about 150 microns. The preferred dispersible resins are those which will pass through a 200 mesh sieve (U.S. Standard Sieve), i.e., those having particle sizes less than about 75 microns.

Polyvinyl chloride homopolymers and copolymers, their methods of preparation and their physical and chemical properties are well known and are exemplified in "Polyvinyl Chloride" by H. A. Sarvetnick, Van Nostrand Reinhold Co., New York, 1969.

The second major component of the compositions of the instant invention is a trimethylol alkane di-allyl ether polycarboxylic acid ester. Such compositions are described in U.S. Pat. 3,316,193.

The trimethylol alkane used in forming this invention is represented by the general formula

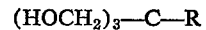

wherein R is methyl or ethyl, and is exemplified by trimethylol propane and trimethylol ethane.

This product is etherified generally by reaction with allyl chloride, or by other well known reaction methods to form the di-allyl ether, which exhibits the general formula

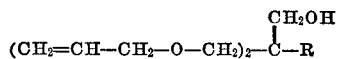

wherein R is as described above. This product is then reacted with the polycarboxylic acid described herein.

Examples of the polycarboxylic acids which are utilizable in the instant invention include predominantly the saturated aliphatic aromatic di-, tri-, and tetracarboxylic acids. Examples include adipic acid, sebacic acid, azelaic acid, phthalic acid, isophthalic acid, terphthalic acid, succinic acid, hexahydrophthalic acid, trimellitic, and pyromellitic acid, naphthalene tetracarboxylic acid, the various corresponding anhydrides, and the like. The most preferred among the dicarboxylic acids is isophthalic acid, while the most preferred tricarboxylic acid is trimellitic anhydride.

The amount of the di-allyl ether which is to be reacted with the polycarboxylic acid is generally no more than one mol of the di-allyl ether material for each carboxylic acid equivalent of the polycarboxylic acid. The use of additional di-ether results in a product having unreacted trimethylol alkane di-allyl ether, which fumes on baking.

In some instances, where a more flexible product is desired, a product wherein the ratio of carboxy equivalents to mols of di-allyl ether is up to about 1.25 to 1.00 can be prepared. The remaining acid equivalents can then be reacted with about 0.05 to 0.25 equivalents of a flexibilizing alcohol containing from about 5 to 18 carbon atoms per molecule. Examples include lauryl alcohol, 2-ethyl hexanol and the like.

In addition, it is possible to prepare water soluble or water dispersible polymers by preparing similar polymers leaving the excess carboxyl groups unreacted. These groups may then be salted with amine and the entire product rendered water-soluble. Preferably these products should have acid values in the range of about 30 to about 90, to insure water solubility or dispersability.

The reaction between the trimethylol alkane di-allyl ether and the polycarboxylic acid is carried out most expeditiously by mixing the trimethylol alkane and the polycarboxylic acid and conducting a direct esterification reaction. The reaction is catalyzed by virtually any esterification catalyst which does not detrimentally react with the sites of unsaturation on the trimethylol alkane material. Most preferred among the esterification catalysts are the titanate esters, such as tetraisopropyltitanate, and di-butyl tin oxide.

The reaction is carried out by mixing the reactants and the catalyst and heating the entire mixture to about 150 to 250° C. The removal of water which is a by-product of this reaction may be facilitated by the use of an azeotrope solvent, such as xylene or mineral spirits. The temperature of the reaction is allowed to rise until the desired degree of reaction is gradually obtained. The extent of reaction is determined by measuring the decrease in acid value of the reaction mixture. When the reaction is completed, the azeotrope solvent can be removed by vacuum application, depending upon the desired end use. Generally where azeotrope solvents, such as xylene or mineral spirits, are utilized, the final solids of the product before stripping will be about 90 to 95%.

There results from the above reaction a material which is in most cases liquid or syrupy at room temperature and which can be further formulated as described herein.

PVC polymer, as previously described, is then blended with the polyester as prepared above. The amount of the polyvinyl chloride polymer which can be added can vary from about 10% to about 75% of the total polymer solids in the formulation.

In order to facilitate dispersion of the polyvinyl chloride polymer in the ester, a co-solvent, such as butyl Cellosolve, ethyl Cellosolve, Cellosolve acetate or other aliphatic alcohols, glycol ethers, esters, ether-esters, or polyglycols can be used. The amount of the co-solvent used should be limited, however, since it tends to increase the viscosity of the finished product. Other stabilizers include materials such as epoxide resins, and dispersing aids, such as the various anionic, cationic, and nonionic surfactants, and may also be utilized.

The basic solvent for the PVC-ester blend is an essentially non-polluting solvent, which includes little or no aromatic materials. Examples include the various exempt mineral spirits and the various low-aromatic napthas. Of course where atmospheric pollution is not a problem, other solvents may be utilized. However, it is desirable that an essentially non-solvent for the polyvinyl chloride material be utilized as the base solvent, since solvation of the polyvinyl chloride tends to rapidly increase the viscosity of the coating system.

In addition to the various named products, the coating compositions of the instant invention can be compounded with pigments, fillers, surface active agents, waxes and the like.

Of particular use in the instant invention are the melamine-aldehyde, benzoguanamine-aldehyde, and urea-aldehyde crosslinking agents, which are particularly uesful where excess carboxyl groups are present in the ether. Most preferred among these crosslinking agents are the hexamethoxy methyl melamines. Up to about 5% of these materials, based upon the ester, can be blended into the final coating system. When this is done, the addition of 0.5 to 2%, based on the crosslinking agent solids, of an acid catalyst is preferred in order to enhance the cure of the melamine, benzoguanamine, or urea-aldehyde curing agent.

The coatings of the instant invention are compounded by blending and mixing according to well known processes.

In the following examples, all parts and percentages, unless otherwise stated, are by weight.

Example 1

Into a reaction flask equipped with a mechanical agitator, reflux condenser and distillation trap were added 2205 parts of trimethylolpropane diallyl ether, 795 parts of adipic acid, 30 parts of dibutyl tin oxide, and 240 parts of xylene. Agitation was begun and a nitrogen flush was initiated. The contents were refluxed at a temperature ranging from 185° C. to 216° C. until the acid value of the contents was reduced to 4.2. The xylene was removed under a 2.5 mm./Hg vacuum, resulting in a product having a Gardner-Holt viscosity of A–B, a Gardner color of 3–4, and a solids content of 93.4%.

Example 2

Utilizing essentially the same procedure as described above, 2,220 parts of trimethylolpropane dialyl ether, 830 parts of isophthalic acid, 30.5 parts of dibutyl tin oxide, and 150 parts of xylene, were heated at temperatures ranging from 325 to 450° F. A product resulted having an acid value of 5.5, a Gardner-Holt viscosity of I–J, a Gardner color of 2–3, and a solids content of 90.4%.

Example 3

Utilizing essentially the same procedure as described in the preceding example, 1993 parts of trimethylolpropane diallyl ether, 761 parts of trimellitic anhydride, 30 parts of dibutyl tin oxide, 246 parts of 2-ethylhexanol and 225 parts of mineral spirits were refluxed at temperatures ranging from 323 to 450° F. until a product having an acid value of 4.3 was obtained. The product exhibited a final Gardner-Holt viscosity of T–U, a solids content of 89.9%, a weight per gallon of 8.59 lbs., an acid value of 4.5, and a Gardner color of 1–2

Example 4

Utilizing the same procedure as set forth above, 2,052 parts of trimethylolpropane diallyl ether, were reacted with 948 parts of trimellitic anhydride, utilizing 30 parts of dibutyl tin oxide as a catalyst, and 150 parts of mineral spirits as a reflux solvent. There resulted a product, after reaction at temperatures ranging from 350 to 450° F., having an acid value of 76.5, a Gardner-Holt viscosity of Y–Z, a solids content of 89.5, a Gardner color of 2–3, and a weight per gallon of 9.01 lbs.

Example 5

The following were ground on a Cowles mixer for 30 minutes: 59.50 parts of the product prepared in Example 1, 10.50 parts of mineral spirits, 30.00 parts of a polyvinyl chloride resin, Bakelite QYOH–1 (Union Carbide), vinyl dispersion resin having a vinyl chloride content of about 100%, an inherent viscosity of 1.25 to 1.32, and a specific gravity of 1.40, and 0.5 parts of BYK 300, a 50% solids silicon resin, available from Byk-Mallinkrodt Chemical Company. 0.5 parts of Aerosol A–102, a di-sodium ethoxylated alcohol half ester of sulfosuccinic acid, were added to the mixture and grinding was resumed for 30 additional minutes.

Example 6

Utilizing a thirty minute Cowles grind, the following were mixed: 3,000 parts of the product prepared in Example 2, 540 parts of QYOH–1, 9.70 parts of BYK–300, and 32.40 parts of Aerosol–A–102. Following grinding, 1%, based upon the solids content of the QYOH–1 material of Epi-Rez 510®, an epoxy resin available from Celanese Coatings Company, having a weight per epoxide of about 180 and a viscosity in centipoise at 25° C. of 12,000, were blended in.

Example 7

Utilizing the same procedure set forth above, the following grind was prepared: 44.57 parts of Example 3, 52.78 parts of QYOH-1, and 2.65 parts of butyl Cellosolve.

100 parts of the above were blended with 92.31 parts of Example 3, 0.7 parts of BYK-300, 9.46 parts of mineral spirits and 2.55 parts of butyl Cellosolve, and ground for thirty minutes on a Cowles mixer.

Example 8-A

A blend of 908.67 parts of Example 4, 144.31 parts of a Monsanto methylated melamine resin, X-746, 929.49 parts of water, 99.06 parts of dimethyl amino ethanol, 1839 parts of butyl Cellosolve, and 4.83 parts of BYK-300 was prepared.

Example 8-B 850 parts of the material prepared in 8-A were ground with 148.5 parts of QYOH-1, and 1.5 parts of Aerosol A-102, for 30 minutes on a Cowles mixer.

Examples 5 through 8

Examples 5 through 8 were applied to a thickness of .1–.2 mil on tin-free steel (TFS) and tin plate panels and baked for 10 minutes at 375° F. A portion of these panels were formed into can ends which were, in turn, used as part of cans which were tested by filling with water and pasteurizing for thirty minutes at 150° F.

| Example | MEK rubs | Pencil hardness TFS | Pencil hardness Tin plate | Pasteurization tests TFS | Pasteurization tests Tin plate |
|---|---|---|---|---|---|
| 5 | 25–30 | 4H–5H | H | 9–10 | 8–9 |
| 6 | 25–30 | 4H–5H | H | 9–10 | 8.9 |
| 7 | 25–30 | 4H–5H | H | 9–10 | 8–9 |
| 8-A | <50 | 4H | 2H | 7–8 | 5–6 |
| 8-B | 30–40 | 4H | H | 9–10 | 8–9 |

NOTE.—10 perfect; 0 total failure.

As can be seen from the above table, when the vinyl dispersion material is left out of the formulation, as shown in 8-A, poor pasteurization properties result. However, when the vinyl dispersion is added an extreme increase in pasteurization properties is seen.

The above examples are meant to be merely exemplary and many variations thereof may be made without departing from the scope of the invention.

What is claimed is:
1. A coating composition comprising:
   A. about 10 to about 75% by weight of a polyvinyl chloride polymer containing from about 60 to 100% by weight of vinyl chloride units and 40 to 0% of monoethylenically unsaturated monomer units, said monomers being copolymerizable with the vinyl chloride monomer; and
   B. about 90% to about 25% by weight of the reaction product of a diallyl ether compound having the general formula

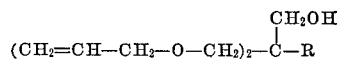

wherein R is methyl or ethyl and a polycarboxylic acid having from 2 to 4 unreacted polycarboxyl (or corresponding anhydride) groups.

2. The composition of claim 1 wherein about 1.0 mols of the diallyl ether are reacted with at least 10 carboxyl equivalents of the polycarboxylic acid.

3. The composition of claim 2 wherein the ratio of the reactants is 1.05 to about 1.25 to 1.00, and wherein about 0.05 to 0.25 equivalents of a 5 to 18 carbon alcohol are co-reacted with said reactants.

4. The composition of claim 1 wherein the polycarboxylic acid is isophthalic acid.

5. The composition of claim 1 wherein the polycarboxylic acid is trimellitic anhydride.

6. The composition of claim 3 wherein the alcohol is 2-ethylhexanol.

7. The composition of claim 1 wherein the reaction product has an acid value of about 30 to 90 in an aqueous dispersion or solution in the presence of a low molecular weight aliphatic amine.

References Cited

UNITED STATES PATENTS 3,316,193   4/1967   Chatfield _____ 260—23.5

PAUL LIEBERMAN, Primary Examiner

C. J. SECCURO, Assistant Examiner

U.S. Cl. X.R.

260—33.2 R, 29.4 UA, 33.6 UA, 78.4 E, 475 N, 485 N, 8.27, 837 PV, 897 C